United States Patent [19]
Woods

[11] Patent Number: 5,203,652
[45] Date of Patent: Apr. 20, 1993

[54] SELF-ALIGNING TAP AND DIE WRENCH AND UNIVERSAL THREADING TOOL

[76] Inventor: Adrian C. Woods, 14401 Boone Rd., Columbia Station, Ohio 44028

[21] Appl. No.: 737,255

[22] Filed: Jul. 29, 1991

[51] Int. Cl.⁵ .............................................. B23G 1/26
[52] U.S. Cl. .................................... 408/112; 408/119; 470/199
[58] Field of Search ...................... 470/198, 199, 207; 408/22, 112, 117, 119, 239 R

[56] References Cited

U.S. PATENT DOCUMENTS

| | | |
|---|---|---|
| D. 255,211 | 6/1980 | Rolnick . |
| D. 259,092 | 5/1981 | Rolnick . |
| 1,148,406 | 6/1915 | Reid . |
| 3,364,510 | 1/1968 | Johnson . |
| 3,653,780 | 4/1972 | Ammatuna . |
| 3,715,168 | 2/1973 | Kuhn . |
| 4,097,182 | 6/1978 | Rolnick . |
| 4,111,591 | 9/1978 | Rolnick . |
| 4,179,231 | 12/1979 | Hadden ................................ 408/112 |
| 4,349,301 | 9/1982 | Boyajian ............................. 408/112 |
| 4,702,131 | 10/1987 | Snow . |
| 4,836,720 | 6/1989 | Hadden .............................. 408/112 |

OTHER PUBLICATIONS

MCMaster-Carr—Tapping Accessories—1990—p. 1300.

Primary Examiner—Daniel W. Howell
Attorney, Agent, or Firm—Oldham, Oldham & Wilson

[57] ABSTRACT

A tap and die wrench for threading flat and round workpieces and, formed of hardened steel or a softer material with hardened steel inserts at those points sustaining torque and tensile forces during operation, provides a body member adapted for receiving and retaining taps and a base adapted for receiving and holding round or hex dies, and the body member and base are mounted upon parallel alignment rods and held apart by a spring bias effected through springs mounted on each of the rods. A tap retained within the body member is tensioned away from the workpiece for simultaneous self-aligning during the tapping process. A die guide insertable into the centralized opening of the body member surrounds and guides the workpiece during the external threading process. Meanwhile, the body member and base are adapted for slidable movement toward and away from each other upon the rods and may be secured at any desired position along the rods by means of a body lock or base lock in order to accommodate variously sized workpieces. The tap and die wrench may be used as a hand tool or in conjunction with a lathe.

20 Claims, 8 Drawing Sheets

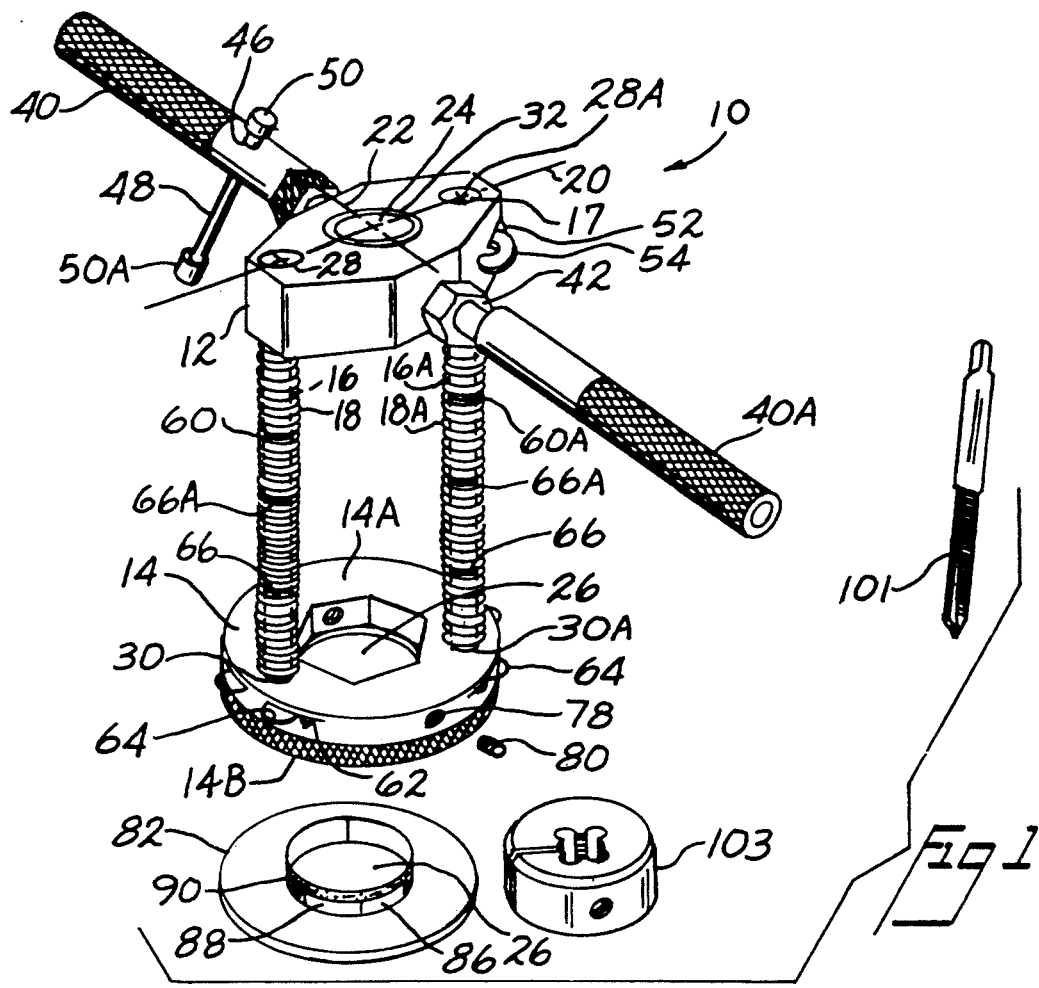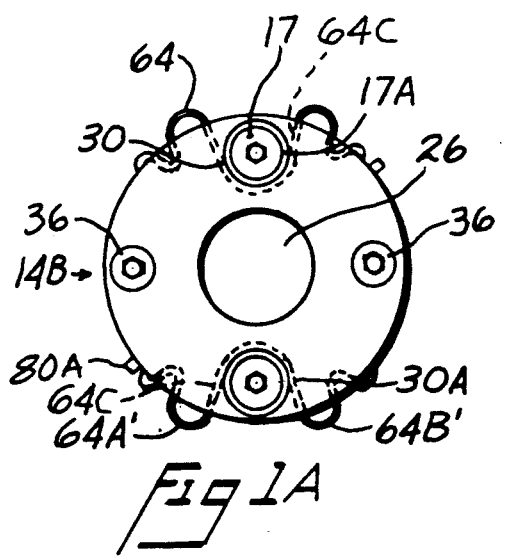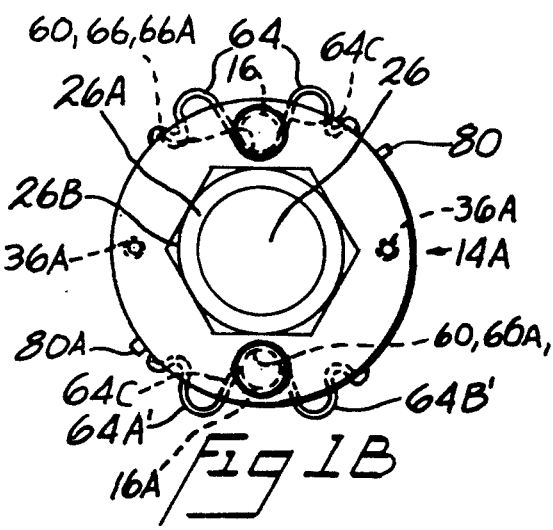

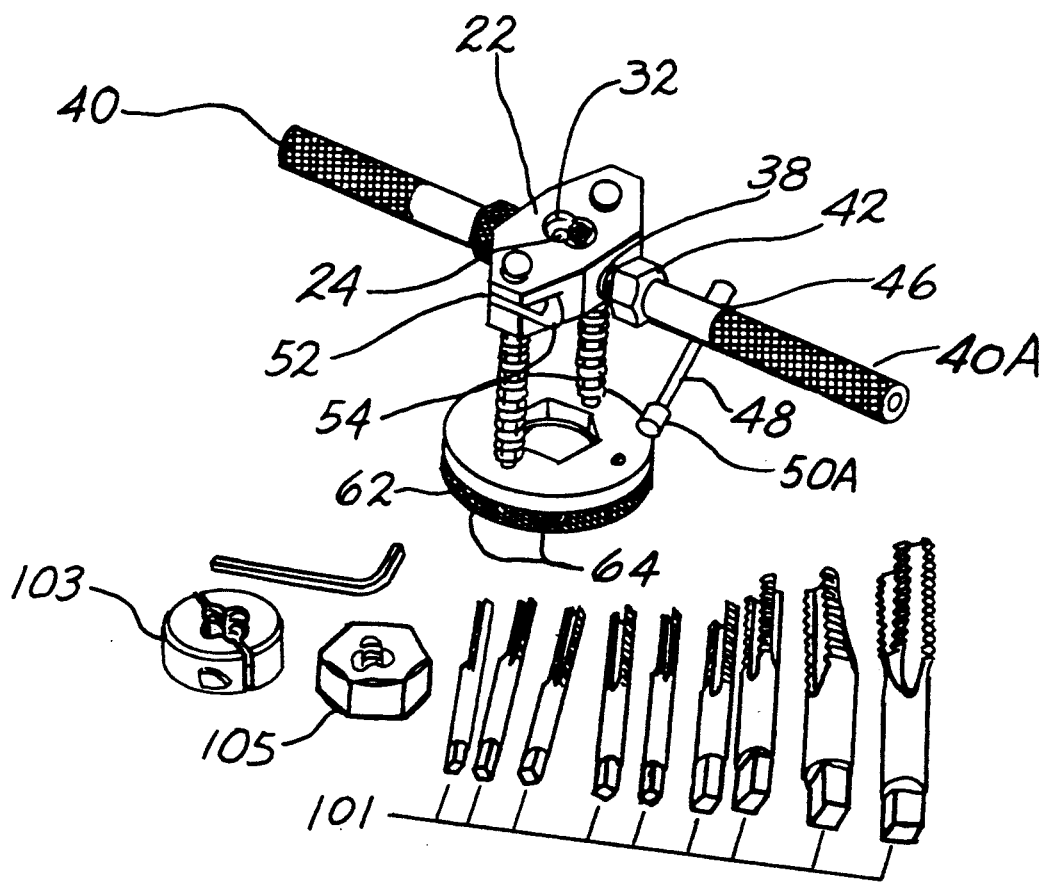
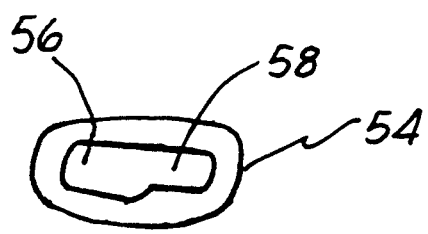

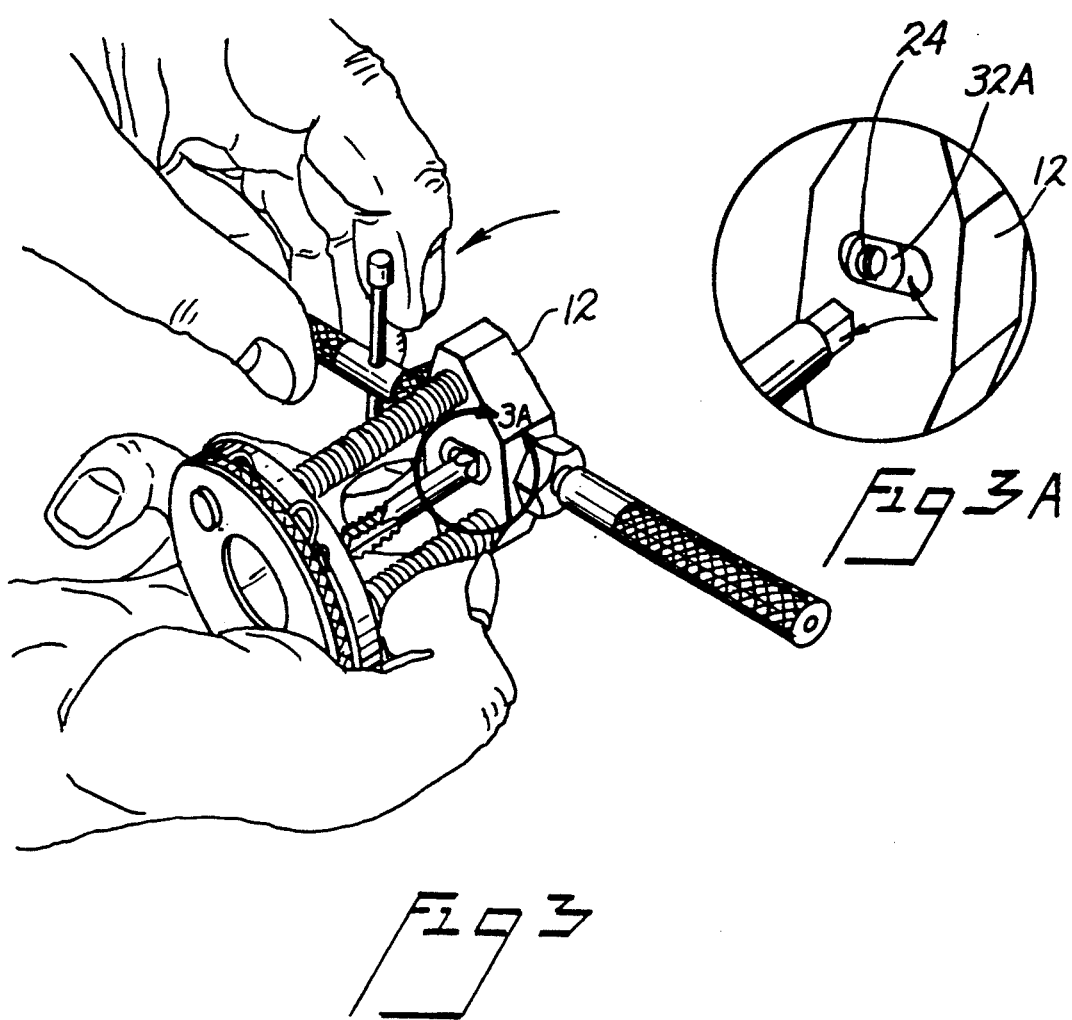

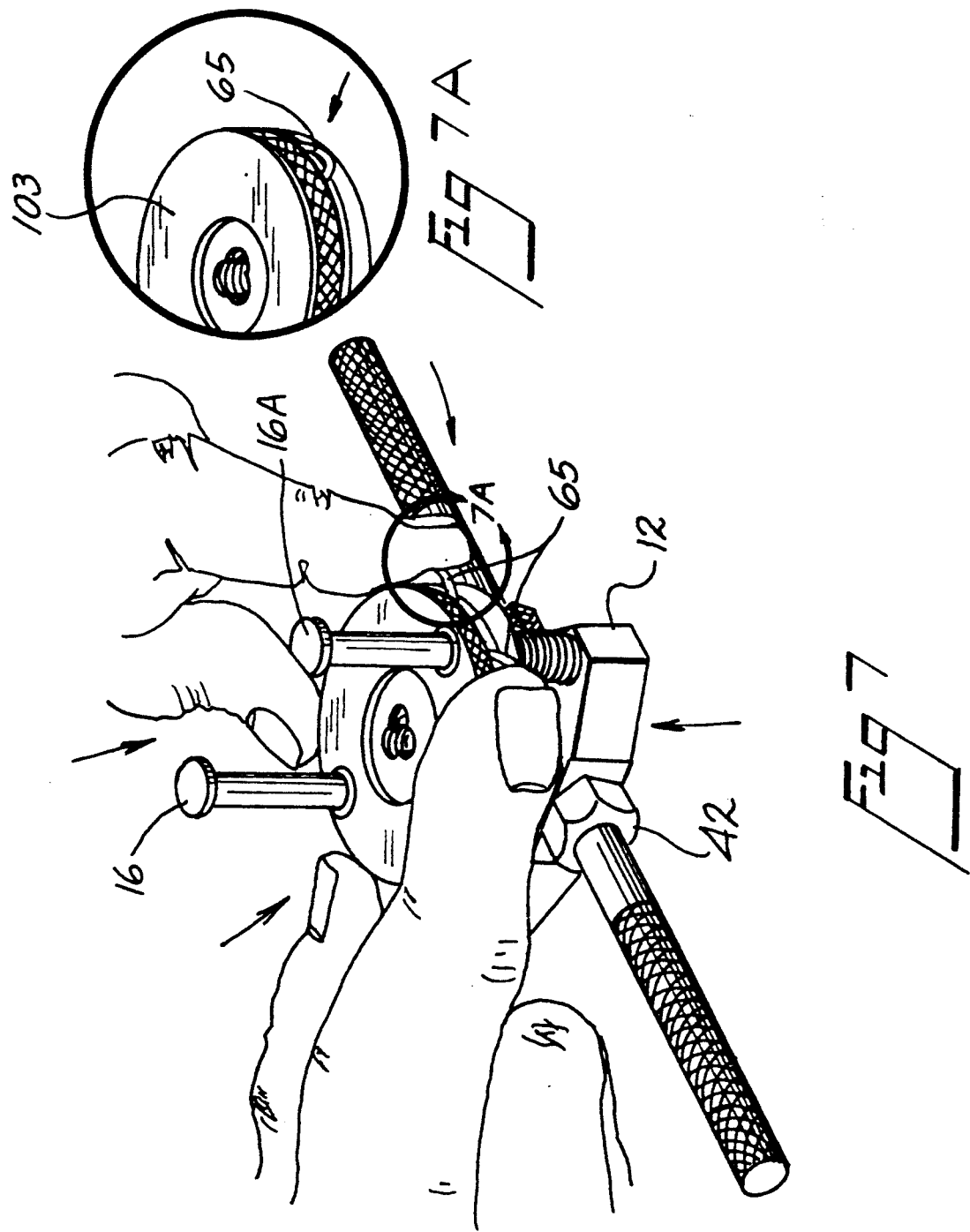

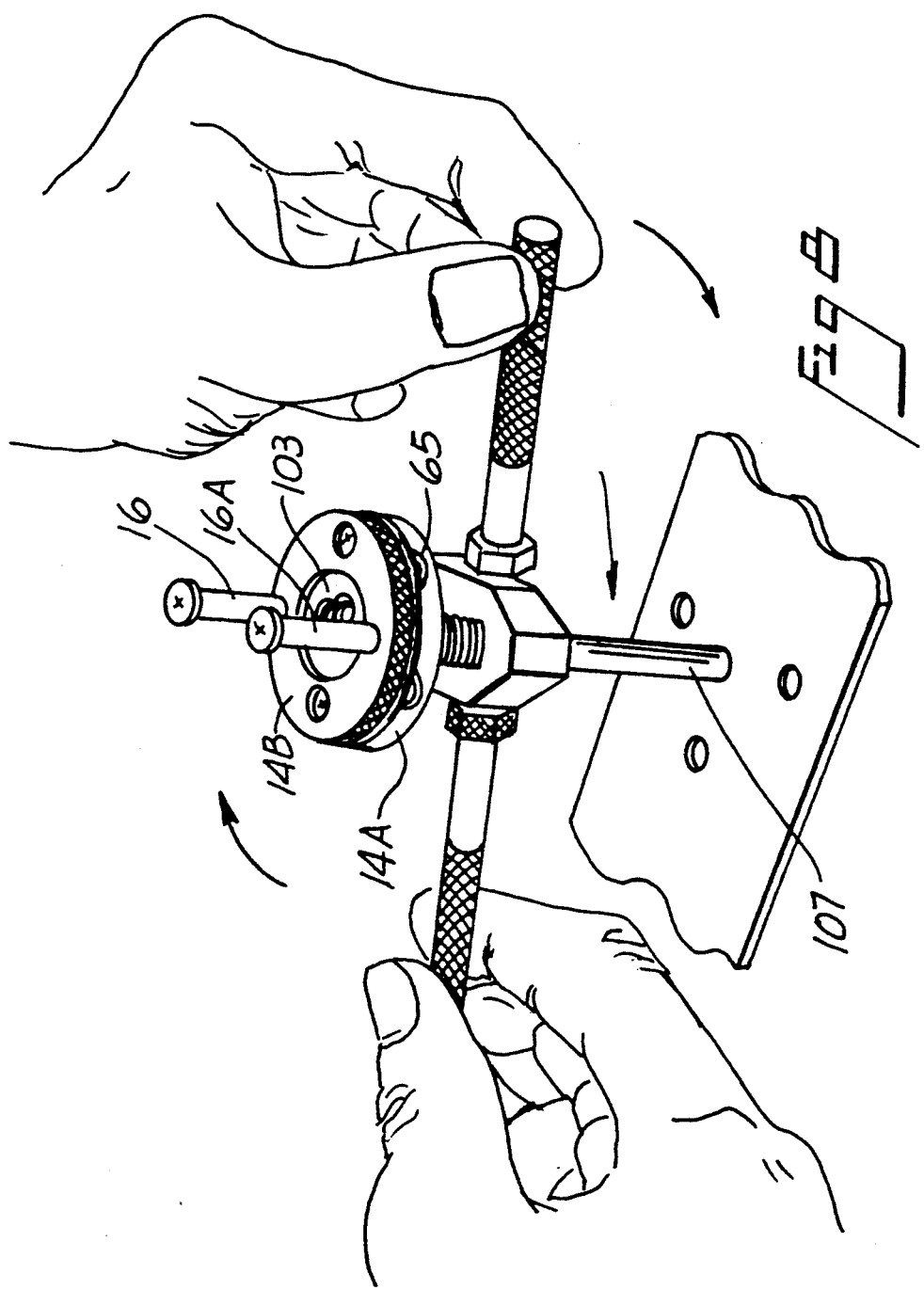

SELF-ALIGNING TAP AND DIE WRENCH AND UNIVERSAL THREADING TOOL

TECHNICAL FIELD

This invention pertains to an improved combination tap and die wrench which has self-aligning features and is further adapted for internal and external threading of a workpiece. The wrench can be used as a hand-held tool or in conjunction with a rotating workpiece in a lathe.

BACKGROUND OF THE INVENTION

Various types of tool and die wrenches have been disclosed in the past, but have been found unsatisfactory for failure to produce a true alignment without exercise of a very high degree of skill and care. At the present time, proper use of a die wrench is time consuming and an extremely high degree of skill is required.

When using a tap wrench, there is a requirement to visually align the tap perpendicular to the work area, which sometimes causes the misalignment of threads and increases the potential for breaking the tap. Likewise when using a die wrench, there is a similar requirement for aligning the die perpendicular to the workpiece which may result in misalignment and increased potential for die breakage.

There is a prior art die wrench which when properly adjusted will produce a true alignment. But it is extremely difficult to adjust and as such, represents a time consuming function for adjustment and the exercise of a great degree of skill in doing so.

There also exists in the prior art a wrench having both tap and die functions, but it will not produce a true alignment of tap or die without time consuming effort and the exercise of a great degree of skill. Most tap wrenches have a limited tap capacity and would require the use of different wrenches to hold various taps from a No. 4 to a ½" tap.

SUMMARY OF INVENTION

Therefore, a principal object of the invention is to provide a multi-purpose tap and die wrench which will accurately align both internal as well as external threads with the use of a tap or die.

A further object of the invention is to provide a tap and die wrench having true alignment capacity from No. 4 to ⅜ths tap or die.

A still further object is to provide a wrench capable of holding a ½ tap or die for conventional use. Yet another objective and advantage is the savings in labor time by use of this tap and die wrench which allows quick alignment of tap or die.

Still another object is the monetary savings achieved by reduction of tap and die breakage.

A still further object is the reduction in skill requirements for the user of the wrench by the incorporation of self-aligning features which aid such alignment.

Still another object is the enhancement in use of a lathe for quick and accurate die threading, and the provision of a guide which allows the wrench to follow the working surface of the lathe parallel to the work being threaded.

Other objects and advantages of the invention will be apparent from the following description taken in conjunction with the accompanying drawings, wherein:

BRIEF DESCRIPTION OF DRAWINGS

FIG. 1 is a three-quarter elevational view of the tap and die wrench in accordance with the subject invention;

FIG. 1A is a bottom view of the die retaining base;

FIG. 1B is a view of the base as seen from the top;

FIG. 2 is an elevational view of the tap and die wrench of the subject invention with a round and a hex die and taps of various sizes to indicate the wrench is adapted to accept both round and hex dies as well as variously sized taps;

FIG. 2A is an elevational view of the body lock;

FIG. 3 demonstrates how a tap is insertable within an opening centrally located in the body of the wrench;

FIG. 3A is an enlarged, fragmentary view of the centralized opening to demonstrate the round part of the tap must stop at the opening and the recessed counterbore forms a support shoulder for the tap;

FIG. 7 is an elevational view of the subject tap and die wrench indicating a push down of the die retaining base in relation to the body by compression of resilient wire base locks which project radially from the sides of the die retaining base, and upon release of the compressed base locks, the die retaining base is held in position upon the interfitting of the resilient wire base locks with die lock grooves in the aligning rods, effectively repositioning the base in relation to the body;

FIG. 7A is an enlarged, fragmentary view of the base lock locks projecting radially from the periphery of the die-retaining base, which locks are adapted to be compressed for release of their retaining action against the aligning rods to allow movement of the die-retaining base in relation to the body of the wrench; and FIG. 8 is an elevational view seen from the bottom of the subject tap and die wrench with the die-retaining base repositioned relative to the body and a rod-shaped workpiece retained in aligned position by the wrench for demonstrating how the wrench is adapted for operatively threading a rod.

DETAILED DESCRIPTION OF THE INVENTION

Figure 4:
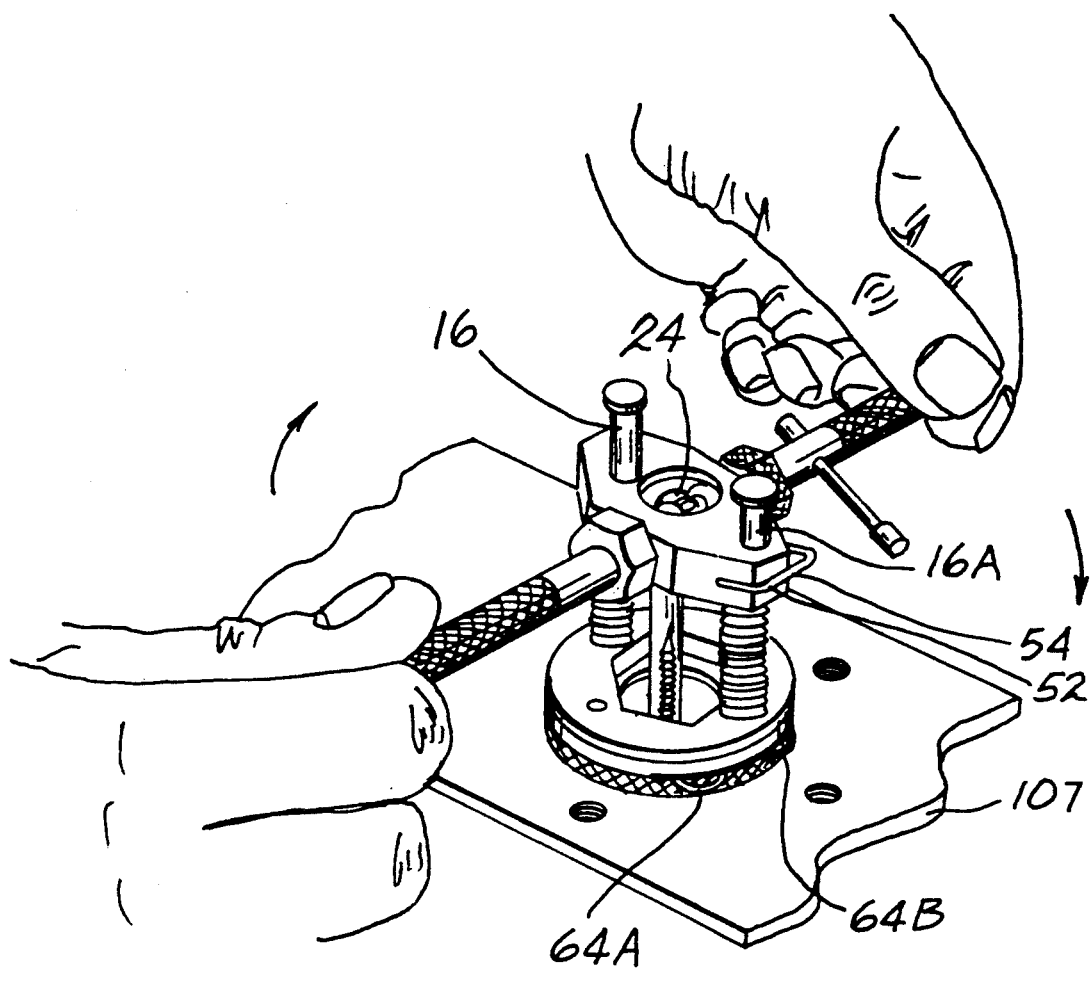
FIG. 4 is an elevational view of the tap and die wrench indicating a tapping operation on a flat stock workpiece.

Referring now more particularly to FIGS. 1 through 8 of the accompanying drawings, there is illustrated the self-aligning concept of this tap and die wrench 10.

The tap and die wrench of this invention as shown in FIG. 1, indicates that in the preferred embodiment the body member 12 is essentially an elongated octagonal cylinder having a long diameter 20 and a short diameter 22, and the base 14 is shaped as a thin cylinder. The body member 12 and base 14 are movably mounted upon a pair of parallel alignment rods 16,16A where they are retained for slidable movement toward and away from each other upon said rods by means of flat head screws 17 which may either be forged to the ends of said parallel alignment rods 16 or threadably inserted into threaded holes 17A drilled at each of the ends of the alignment rods 16. Each of the parallel alignment rods 16,16A is surrounded by a metallic spring 18, 18A which is preferably a steel coiled compression spring. The springs 18, 18A serve to bias the body member 12 and base 14 apart and normally hold the body member 12 and base 14 at opposite ends of the parallel alignment rods 16. The springs 18,18A must not incorporate excessively strong bias, however, for use of the wrench 10 requires slidable movement of the body member 12 and base 14 toward and away from one another. Thus, the steel coiled compression springs preferably have a diameter in the range between 23/1000ths and 27/1000ths inch.

There is provided in the body member 12 a centralized opening 24 therethrough and the base 14 likewise has a corresponding centralized opening 26 therethrough and the body member and base further have collinear apertures 28,28A 30,30A. In the body member, the apertures 28,28A are peripheral to the centralized opening 24 and are located on the long diameter 20 thereof and a corresponding diameter of the base, so that the apertures of the body member 28,28A and of the base 30,30A, are positioned for receiving the ends of the parallel alignment rods 16,16A insertable in the apertures.

As a means for mounting, flat head screw may be forged at the ends of the alignment rods to hold body member and base upon the rods. In the alternative, threaded holes are preferably provided in the ends of the rods for threadably inserting flat head screws into the holes in the rods for retaining the body member 12 and base 14 upon the rods 16,16A.

The centralized opening 24 of the body member is further provided with a recessed counterbore 32,32A located at both ends of the centralized opening, and the counterbore has sufficient depth for allowing the squared portion of a tap 101, which is insertable in the centralized opening 24, to seat squarely against an interior side of the centralized opening 24. Thus, the centralized opening 24 in the body member is adapted to hold either a tap 101 or a die guide 34. And the centralized opening 26 of the base is adapted to hold a round die 103 or, in the alternative, a hex shaped die 105.

The springs 18,18A are adapted for providing a consistent tensioning force directly opposed to the downward tensile threading force in the tapping process, and I have discovered that the tap 101 constantly self-aligns due to the tensioning force, while the body member 12 turns in the tapping process. The means for self-aligning feature operates essentially 360° around the tapping process since the alignment rods are spaced apart and simultaneously exert upward forces while rotating around the tap as it also turns. The tensioning force further reduces the occasions for misalignment of the threads and reduces potential breakage of the tap 101. Once again, the strength and degrees of spring tensioning is of extreme importance, since extreme spring bias would pull the tap out of threads during use of a small tap and, meanwhile, the spring bias must remain strong enough to allow accurate tapping when a tap of up to ⅜ inch is being used.

When external threads are being applied to a workpiece 107 by use of die inserted into the centralized aperture 26 of the base 14, a die guide 34 insertable in the centralized opening 24 of the body member 12 surrounds the workpiece 107 and guides the die in the outside threading process.

The tap and die wrench 10 of this invention may be fabricated from hardened tool steel or hardenable cast steel or cast aluminum, however, when aluminum, or thermoplastic material, or magnesium are used for fabrication of the wrench, then those areas subject to torque and tensile forces must be comprised of a hardened steel material. For example, the body member 12 may be comprised of a thermoplastic material, but then an insert comprising hardened steel must be used within the area of the centralized opening for providing strength where the tap is received and retained and torque and tensile forces applied.

There is provided within subject tap and die wrench 10 a means for retaining variously sized taps within the body member. In the preferred embodiment, a pair of radial holes 38,38A are bored in the sides of the body member formed as an elongated octagonal cylinder on the short diameter thereof 22. The axes of the radial holes 38,38A have a linear alignment corresponding with the short diameter 22 of the body member and those axes are orthogonal to the axis of the centralized opening 24 and communicates with the centralized opening. These threaded, radial holes 38,38A are adapted for receiving elongated cylindrical and adjustable body handles 40, 40A which have a threaded end where there is mounted on each handle a threaded handle nut 42,42A. In the preferred embodiment, only one threaded radial hole 38 communicates with the centralized opening 24 and only one body handle 40 is threadably adjustable; and in that case, the second handle is provided to balance the wrench and aid in its use as a conventional tap or die wrench and to provide support when the wrench is used in conjunction with a lathe. The single threadably adjustable body handle 40 is adapted to be tightened against the squared portion at one end of a tap 101 insertable within the centralized opening 24 of the body member 12. When the threaded end of the body handle 40 has been adjustably tightened against the squared portion of the tap 101, then the handle nut 42 is threadably tightened against the side of the body member to secure and retain the body handle 40 in position for positively retaining the tap. Knurled portions may be provided along the length of the body handles 40, 40A and extending to a second end of each of the body handles. Furthermore, a radial bore 46 may be provided through the threadably adjustable body handle 40 which communicates with the centralized opening 24 for receiving a snugging pin 48 in the bore 46, which snugging pin 48 would have a retaining cap 50,50A at either end, and the snugging pin is adapted to provide leverage for adjusting and threadably tightening that body handle 40 against the tap 101.

FIG. 1 and FIG. 2 show that the tap and die wrench 10 includes a means for locking the body member along the length of the alignment rods 16, since the body member 12 is slidably movable along those rods 16. A slot 52 is formed in the side of the body member, at a narrower end of the elongated octagonal cylinder, and the slot 52 is formed to have sufficient depth for allowing it to be traversed therethrough by an alignment rod 16.

As shown in FIG. 2A, a flattened rectangular plate with a lengthwise interior gap is configured to form a body lock 54, and the gap has a widened section 56 at one end of the rectangular plate, that widened section having a diameter corresponding with the diameter of the alignment rod, and the gap further has a narrowed section 58 at a second end lengthwise within the rectangular plate forming the body lock 54, which narrowed section has a width less than the diameter of the associated alignment rod 16. The wider section of the body lock is slidably mounted upon an alignment rod 16 within the slot 52 formed in the body member 12.

There is further provided at least a series of body lock grooves 60,60A formed along the length of the alignment rod 16 which traverses the slot. As the body member 12 is slidably moved along the length of the alignment rod 16 against the biasing action of the springs 18,18A, the narrowed down neck portion 58 of the body of the body lock 54 may be slidably moved into a body lock groove 60,60A when the body lock is in alignment with a body lock groove 60,60A in the alignment rod 16, which slidable sideways movement of the body lock 54 into the body lock groove 60,60A effectively locks the body member in position at that groove.

There is likewise provided a means for repositioning the base 14 as it slidably moves along the length of the alignment rods 16,16A. Thus, a pair of slits 62,62A are cut in the side of the base 14, and each of the slits 62,62A is traversed by an alignment rod 16,16A. A resilient metallic wire 64, which is preferably fabricated of steel, is positioned in each of slits 62,62A. The wire 64 has curved end portions 64A, 64B which protrude from the slits at the side of the base and it further incorporates a curved central portion 64C which curves around and is biased against an associated alignment rod 16 or 16A to form the base lock 65.

See FIG. 1, FIG. 1A, and FIG. 1B. The resilient metallic wire 64 which forms the base lock 65, and particularly the curved end portions 64A, 64B, which protrude from the slits at the sides of the base, are adapted to be compressed for release of their retaining action (bias) against the alignment rods to allow friction free movement of the die-retaining base in relation to the body of the wrench.

When the protruding end portions of the resilient metallic wire are compressed against the base, the bias of the curved central portion 64C against the associated alignment rod 16 or 16A is relieved, whereby the base may be slidably repositioned along the length of the alignment rods toward the body member. In other words, compression of the protruding end portions 64A, 64B essentially causes the central portion 64C of the resilient wire to radiate away from the associated alignment rod and the base 14 becomes slidably movable along the rod for repositioning adjacent a die locking groove 66, 66A, 66B. Release of compression on the end portions 64A, 64B of the resilient wire 64 allows the central portion 64C to bias against an associated alignment rod and insert into an aligned locking groove to effectively reposition and restrain the base 14 from further movement from that position.

In the preferred embodiment, the base 14 is formed from inner and outer cylindrical plates 14A,14B each of which has threaded holes 36A to receives flat head screws 36 for threadably connecting the plates 14A,14B tightly together to form the base 14. Each of the plates has a central opening and the central opening 26 through the outer plate 14B has a circular form with a surrounding flange rising contiguously to form a seat 26A and shoulder portion 26B, which seat 26A and shoulder portion 26B are adapted to hold a round die 103. Meanwhile, the central opening 26 in the inner plate 14A has a hexagon form and that central opening 26 of the inner plate 14A surrounds the shoulder portion 26B of the outer plate 14B, and the hexagon formation of the inner plate 14A is adapted to hold a hex die 105. In this embodiment, when the base 14 is formed by inner and outer plates 14A,4B, the slit 62 is cut into the surface and side of the inner plate 14A and the resilient wire 64 forming the base lock 65 is movably positioned within the slit 62 and held in place by the tightly connected outer plate 14B. Radial holes 78,78A are drilled through the sides of the inner plate 14A of the base 14, which holes communicate the central opening 70, and those threaded holes 78,78A are adapted to receive set screws 80,80A to bear against and hold and position a die 103,105 insertable in said central opening 70, as shown in FIG. 3. The outer plate 14B in this configuration may be referred to as a base cap.

There is further provided a base cap bearing 82 which is formed as a thin plate having inner and outer surfaces, a round central opening 26 corresponding with the central, circular opening 26 through the outer plate 14B, and the base cap bearing 82 has a projecting collar 86 surrounding its central opening 26 on the inner surface of the base cap bearing 82. The projecting collar 86 has a circular undercut portion 88 adjacent its inner surface, and a circular overcut portion 90 at its outer end. The collar 86 is thus adapted to snap into the circular opening 26 of the outer plate or base cap 14B, of the base 14, thereby allowing the tap and die wrench 10 to rotate freely in relation to the base cap bearing 82. This base cap bearing 82 may be fabricated from DELRON TM, DACRON TM, NYLON TM, TEFLON TM, or other elastic materials. The base cap bearing 82 allows for smoother tapping operation and is effective to avoid scratching of the workpiece surface 107 in the tapping process. The base cap bearing 82 reduces friction and adapts the tap and die wrench 10 for smoother, more aligned tap.

A tubular die guide 34 is formed for insertion in the centralized hole through the body member and these die guides 34, which would be appropriately sized to have internal diameters adapted to receive and guide variously sized workpieces 107 to the die 103,105, are provided with a widened rim 34A at one end thereof. The die guide 34 may similarly be comprised of DACRON TM, NYLON TM, TEFLON TM, DELRON TM. This die guide 34 serves to relieve friction off the workpiece 107 during the external threading process and the die guide 34 acts as a bearing surface and allows the workpiece to be accepted and held for true alignment of the rod or other workpiece to be threaded.

Figure 5:
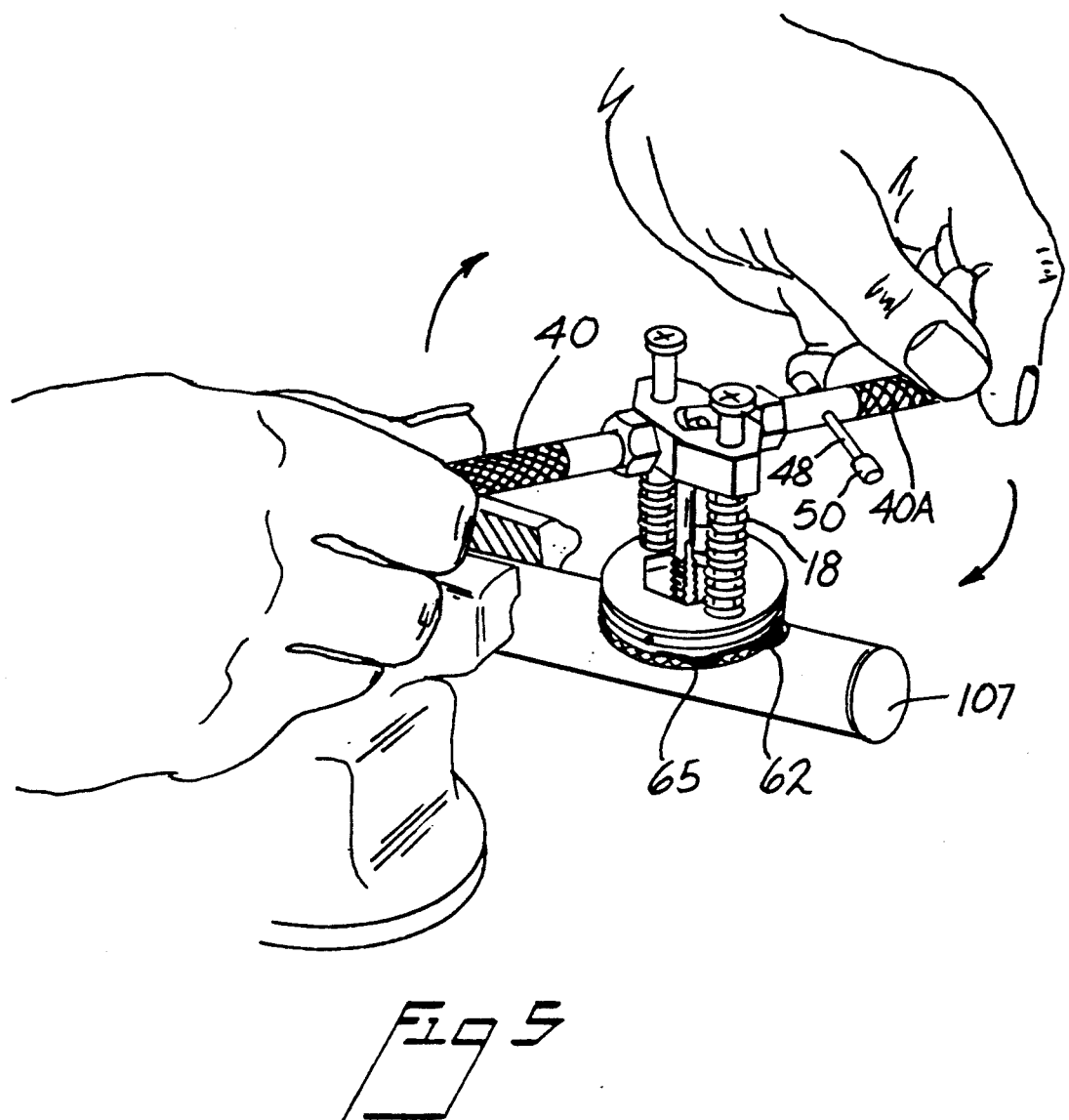
FIG. 5 is an elevational view of the tap and die wrench of this invention indicating the wrench is adapted for tapping on a round stock workpiece.
Figures 6, 6A:
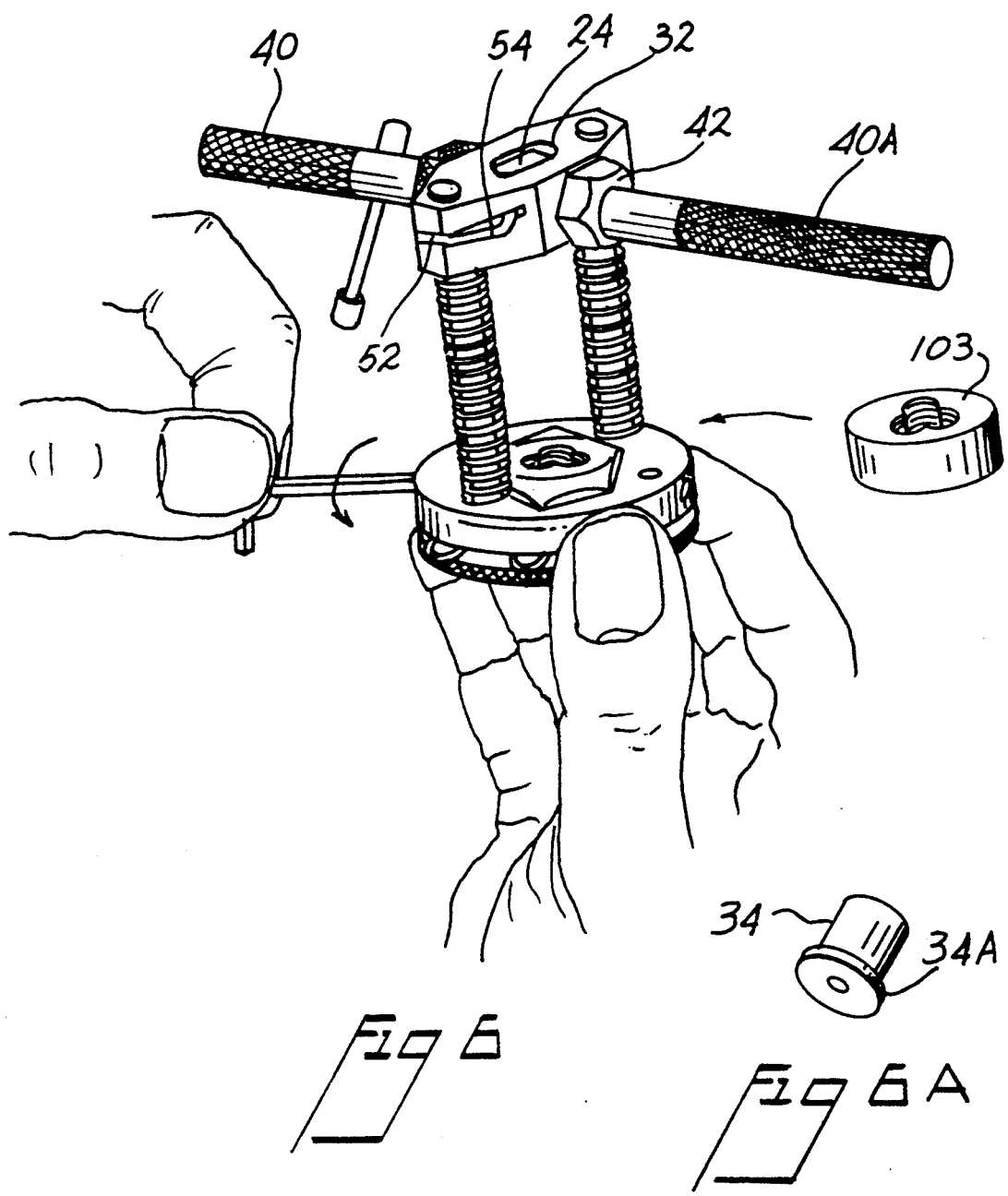
FIG. 6 indicates how the die retaining base of the subject tap and die wrench accepts both round and hex dies which are retained within the base by tightening set screws in threaded radial holes in the die retaining base by the use of an Allen wrench.
FIG. 6A depicts an elevational view of a die guide.

When using the tap and die wrench 10 of this invention, a tap 101 is first inserted in the centralized opening 24 in the body member 12. If a shorter tap is being used, then the body member 12 must be slidably moved along the alignment rods 16,16A to reach the workpiece. And if the wrench is to be used as a conventional tap wrench, then the body lock 65 mounted on an alignment rod 16 may be slidably locked onto a body lock groove so that any sized tap can reach the workpiece; or when a die has been inserted in the die retaining base, the wrench used for conventional die threading. As shown in FIG. 3, FIG. 4 and FIG. 5, the adjustable body handle is tightened against the squared portion of the tap to secure and retain the tap in position against the side of the centralized opening. In the alternative, for die threading when a round or a hex die is being employed, then the base 14 can be slidably moved along the alignment rods 16,16A toward the body member 12, whereupon the base can be secured in position by use of the base lock wires insertable into appropriate die lock grooves along the length of the alignment rods, and the tap and die wrench can then be operated as a self-aligning die wrench after insertion of die guide 34 into the centralized opening 24 of body member 12, as seen in FIG. 6, FIG. 7 and FIG. 8. The base cap bearing 82 is snapped into position over the outer plate or base cap 14B. A smooth and accurate tapping process may then be accomplished with the bias of the springs 18,18A creating a force opposed to the downward threading force in the tapping process for self-aligning the tap 101 as the tap and die wrench 10 is rotated.

For external threading, a round 103 or hex die 105 is inserted within the centralized opening 26 of the base, whereupon the set screws 80,80A are tightened to hold the die 103,105 in position, as shown in FIG. 6. A die guide 34 having appropriate dimensions for suitability to the workpiece 107 being threaded may then be inserted into the centralized opening 24 of the body member 12. The wrench 10 may then be configured according to the size of the workpiece 107 subject to threading. In other words, the base 14 may be slidably moved along the alignment rods 16,16A toward the body member 12 by compressing the protruding end portions 64A,64B of the resilient metallic wire 64 forming the base lock 65 until the base 14 is repositioned at an appropriate point along the alignment rod 16,16A adjacent a die locking groove 66,66A,66B, whereupon the base lock ends are released from compression and the central portion reinserts into an aligned die locking groove 66,66A to effectively reposition and restrain the base 14 from further movement at that point and, thus, accommodate the smaller workpiece which is further supported and held in alignment by the die guide 34, as seen in FIG. 7.

This tap and die wrench 10 can be used in conjunction with a lathe for the same threading processes. As such, when the lathe rotates the workpiece 107 into a die, the tap and die wrench 10 is drawn in toward the workpiece, while the body handles hold the wrench stationary upon the square tool post or square cross-line section of the lathe. Meanwhile, the die guide 34 surrounds the workpiece and guides the workpiece for added stability and true alignment of the workpiece 107 to be threaded.

The terms and expressions which have been used herein are used as terms of description and not of limitation, and there is no intention in the use of such terms and expressions of excluding any equivalent of any of the features shown or described, or portions thereof, and it is recognized that various modifications are possible within the scope of the invention claimed.

What is claimed is:

1. A tap and die wrench for retaining a tap for tapping rods or other round stock as well as flat workpieces, and for retaining various dies for threading workpieces, comprising:
   a body member and a base movably mounted upon a pair of parallel alignment rods by a means for mounting on each of the ends of said parallel rods, said body member and base adapted for slidable movement toward and away from each other upon said rods;
   a means for retaining said tap associated with said body member;
   a means for self-aligning associated with said alignment rods and positioned between said body member and said base;
   a means for locking said body member in position along the length of said alignment rods; and,
   a means for repositioning said base along the length of said alignment rods.

2. A tap and die wrench in accordance with claim 1, wherein said means for self-aligning comprises:
   a spring surrounding each of said pair of parallel alignment rods along its length, said body member and said base effectively biased apart by said springs, and said tap insertable in said body member is simultaneously aligned by said spring bias concurrent with the tapping process.

3. A tap and die wrench in accordance with claim 2, wherein said spring surrounding each of the alignment rods is a steel coiled compression spring.

4. A tap and die wrench in accordance with claim 3, wherein the diameter of said spring is in a range between 23/1000ths and 31/1000ths inch.

5. A tap and die wrench in accordance with claim 1, wherein said body member is formed as an elongated octagonal cylinder having a long diameter and a short diameter, and said base is shaped as a thin cylinder.

6. A tap and die wrench in accordance with claim 1, further comprising:
   a centralized opening through said body member adapted for holding either a tap or a die guide, and a corresponding centralized opening through said base adapted for holding a round or a hex die;
   said body member and base further having a pair of collinear apertures therethrough located on the long diameter of said body member and a corresponding diameter of said base, said apertures through said body member and said base equally spaced apart and positioned for receiving the ends of said parallel alignment rods insertable in said apertures.

7. A tap and die wrench in accordance with claim 6, further comprising:
   a recessed counterbore located at both ends of said centralized opening through said body member, said counterbore having sufficient depth to allow a squared portion of said tap insertable in said centralized opening to seat squarely against a side of said opening.

8. A tap and die wrench of claim 7, wherein said body member is comprised of aluminum, and said centralized opening and recessed counterbore are formed by an insert comprised of hardened steel.

9. A tap and die wrench in accordance with claim 1, wherein said wrench is fabricated of hardened steel.

10. A tap and die wrench in accordance with claim 1, wherein said means for mounting comprises a flat head screw forged at each of the ends of said parallel rods.

11. A tap and die wrench in accordance with claim 1, wherein said means for mounting comprises:
   a threaded hole in the ends of each said alignment rod and flat head screws threadably inserted into the holes in the rods, said body member and base held in position upon said rods by said flat head screws tightened in the ends of said rods.

12. A tap and die wrench in accordance with claim 1, wherein said means for retaining comprises:
   at least one threaded radial hole bored in the side of said body member, having an axis orthogonal to the axis of, and communicating with, said centralized opening, and a linear alignment corresponding with the short diameter of said body member;

at least one elongated, cylindrical and adjustable body handle having a threaded first end and a threadably mounted handle nut on each said body handle, said at least one handle adapted to be threadably inserted into said at least one threaded radial hole in the side of said body member and adjustably tightened against a squared portion at one end of a tap inserted within the centralized opening in the body member, and said handle nuts adapted to threadably secure against said body member and retain in position said at least one handle when said at least one body handle tightens against and retains variously sized taps and die guides in said centralized opening.

13. A tap and die wrench of claim 1, wherein the means for locking said body member in position comprises:

a slot formed in the side of said body member, said slot traversed therethrough by an alignment rod;

a flattened rectangular plate with a lengthwise interior gap forming a body lock, said gap having a wide section corresponding to the diameter of said alignment rod and a narrowed down neck portion having a width less than the diameter of said alignment rod, said body lock slidably mounted upon an alignment rod within said slot formed in said body member; and at least one body lock groove formed on said alignment rod traversing said slot, so that when the body member is slidably moved along said alignment rod against the biasing section of said springs, the body member is adapted to be locked into a desired position by slidably moving the neck portion of said body lock into said body lock groove in said alignment rod to effectively lock said body member in position at said groove.

14. A tap and die wrench in accordance with claim 1, wherein the means for repositioning said base comprises:

at least one slit cut in the side of said base, each said at least one slit traversed by an alignment rod;

a resilient metallic wire positioned in each said at least one slit, said wire having curved end portions protruding from the slit and side of said base, and a curved central portion biased against an associated alignment rod to form a base lock; and, a plurality of die locking grooves cut in said associated alignment rod, and by compressing said protruding end portions, said resilient wire central portion radiates away from the associated alignment rod allowing the base to slidably move along said rod and reposition adjacent a die locking groove; and by releasing compression of said end portions, said resilient wire reinserts into an aligned die locking groove to effectively reposition and restrain said base from further movement.

15. A tap and die wrench according to claim 14, wherein said resilient metallic wire forming a base lock is fabricated of steel.

16. A tap and die wrench in accordance with claim 6, further comprising:

inner and outer cylindrical plates each having threaded holes to receive flat head screws for threadably connecting said plates tightly together to form said base, each of said plates having a central opening;

the central opening through said outer plate having circular shape and a surrounding flange rising contiguously to form a seat and shoulder portion, said shoulder portion adapted to hold a round die;

said central opening in said inner plate formed as a hexagon surrounding said shoulder portion and adapted for holding a hex die.

17. A tap and die wrench in accordance with claim 16, wherein at least one slit is cut into a surface and side of said inner plate;

a resilient metallic wire movably positioned in each said at least one slit, said wire having curved end portions protruding from the slit at the side of said base, and a curved central portion which curves around and is biased against an associated alignment rod to form a base lock; and an outer cylindrical plate tightly compressed against said inner plate by connecting screws to hold said resilient wire in movable position within each said at least one slit.

18. A tap and die wrench in accordance with claim 16, further comprising:

at least one threaded radial hole drilled through the side of said inner plate of the base communicating with said central opening, said at least one hole adapted for receiving a set screw to bear against and hold a die insertable in said opening.

19. A tap and die wrench in accordance with claim 1, further comprising:

a base cap bearing formed as a thin plate having inner and outer surfaces, a round central opening corresponding to said central, circular opening through said outer plate, and a projecting collar surrounding said central opening on the inner surface of said base cap bearing;

said projecting collar having a circular undercut portion adjacent said inner surface, and a circular overcut portion at its outer end, said overcut portion of said collar adapted to snap into said circular opening of the outer plate of said base and retained in rotatable position by said overcut portion allowing said tap and die wrench to rotate freely in relation to said base cap bearing; and said base cap bearing fabricated of a material chosen from a group comprising DACRON TM, NYLON TM, TEFLON TM, DELRON TM.

20. A tap and die wrench in accordance with claim 1, further comprising:

a tubular die guide insertable into said centralized hole through said body member, having a widened rim at one end and a internal diameter adapted to receive and guide said workpiece to said die.

* * * * *